(12) United States Patent
Shahoumian et al.

(10) Patent No.: US 7,286,969 B2
(45) Date of Patent: Oct. 23, 2007

(54) METHOD FOR DETERMINING PLACEMENT OF COMPONENTS IN RACK

(75) Inventors: Troy Alexander Shahoumian, Sunnyvale, CA (US); Dirk Beyer, Walnut Creek, CA (US); Alex Zhang, San Jose, CA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 654 days.

(21) Appl. No.: 10/623,444

(22) Filed: Jul. 18, 2003

(65) Prior Publication Data

US 2005/0071134 A1    Mar. 31, 2005

(51) Int. Cl.
G06F 17/50 (2006.01)
H05K 7/16 (2006.01)
A47F 7/00 (2006.01)

(52) U.S. Cl. .............................. 703/1; 361/727; 211/26

(58) Field of Classification Search ................ 703/1; 361/727; 211/26
See application file for complete search history.

(56) References Cited

U.S. PATENT DOCUMENTS 5,383,562 A * 1/1995 Gay ...................... 211/181.1
5,850,539 A * 12/1998 Cook et al. .................... 703/20
6,086,617 A * 7/2000 Waldon et al. .................. 703/2
6,378,119 B1 * 4/2002 Raves .......................... 716/10

OTHER PUBLICATIONS

Koolen et al., "A Low-Cost, High-Density Mounting System for Computer Clusters" 2001 IEEE p. 157-162.*

* cited by examiner

Primary Examiner—Anthony Knight
Assistant Examiner—Tom Stevens

(57) ABSTRACT

In one embodiment of a computer implemented method of determining placement of components in a rack, a rack height, a set of components to be placed in the rack, and a height are provided for each of the components. A placement of the components in the rack is determined according to constraints. The placement of the components is then evaluated according to an objective. The constraints may comprise a rack height constraint, a single placement constraint, and a non-overlapping constraint. The rack height constraint ensures that placement of a particular component does not result in a top height of the particular component exceeding the rack height. The single placement constraint ensures that each component is placed once and only once. The non-overlapping constraint ensures that each slot in the rack is occupied by no more than a single component. The method may further comprise providing a weight and a weight distribution for each component in the set of components. In this embodiment, the objective comprises seeking a minimum height for a center of gravity of the components.

32 Claims, 2 Drawing Sheets

METHOD FOR DETERMINING PLACEMENT OF COMPONENTS IN RACK

FIELD OF THE INVENTION

The present invention relates to the field of determining placement of computer components in a rack. More particularly, this invention relates to the field of determining placement of computer components in a rack where the placement is determined using a computer implemented method.

BACKGROUND OF THE INVENTION

Computer components are placed into racks, which are placed in computer rooms. Choice of the racks, assignment of the computer components to particular racks, and assignment of the components to particular slots in a particular rack involves weighing different objectives and considering a number of technological, ergonomic, and esthetic constraints. In the prior art, these decisions are made by human specialists. Disadvantages of this approach are that it is time consuming and may not find a near optimum solution.

What is needed is a method of automating a determination of placement of components in a rack.

SUMMARY OF THE INVENTION

The present invention is a computer implemented method of determining placement of components in a rack. In one embodiment, a rack height, a set of components to be placed in the rack, and a height are provided for each of the components. A placement of the components in the rack is determined according to constraints. The placement of the components is then evaluated according to an objective.

The constraints may comprise a rack height constraint, a single placement constraint, and a non-overlapping constraint. The rack height constraint ensures that placement of a particular component does not result in a top height of the particular component exceeding the rack height. The single placement constraint ensures that each component is placed once and only once. The non-overlapping constraint ensures that each slot in the rack is occupied by no more than a single component.

The method may further comprise providing a weight and a weight distribution for each component in the set of components. In this embodiment, the objective comprises seeking a minimum height for a center of gravity of the components.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

The present invention is a computer implemented method for determining placement of components in a rack. Preferably, the placement of the components in the rack is performed as part of a larger computer implemented method, which begins with a large set of components that are to be placed in a plurality of racks and which determines a rack selection and a rack assignment in addition to determining the placement of the components in each of the racks. The rack selection determines which rack sizes are needed and a quantity for each of the rack sizes. The rack assignment determines which of the large set of components are to be placed in each of the racks. The rack selection and the rack assignment are the subject of U.S. patent application Ser. No. 10/289,662 filed on Nov. 6, 2002, and entitled, "Methods and Apparatus for Designing the Racking and Wiring Configurations for Pieces of Hardware," which is incorporated herein by reference in its entirety. Alternatively, the computer implemented method of determining placement of the components in the rack is performed as a stand alone computer implemented method.

Figure 1:
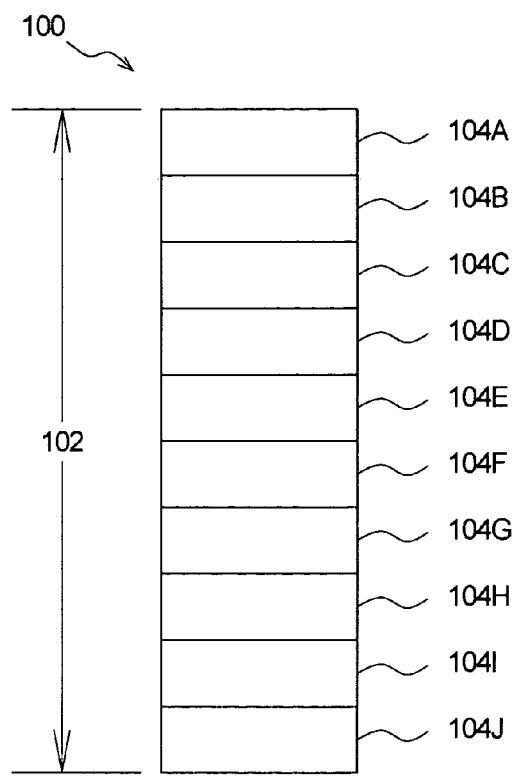
FIG. 1 illustrates a rack according to an embodiment of the present invention.
Figure 2:
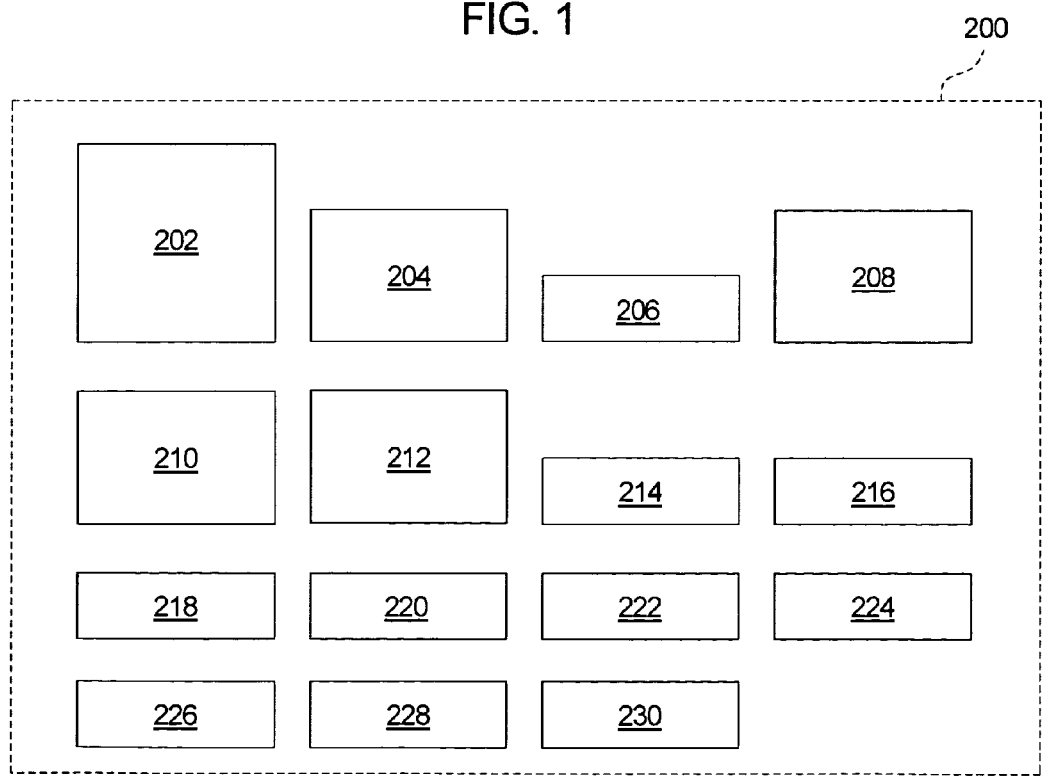
FIG. 2 illustrates typical components for placement in the rack according to an embodiment of the present invention.

An exemplary rack is illustrated in FIG. 1. The rack 100 comprises a rack height 102 and a plurality of slots, 104A . . . 104J. Typical components that might be placed in the rack are illustrated in FIG. 2. The typical components 200 include a computer 202, a display 204, a keyboard 206, a storage device 208, a disk array 210, a tape device 212, a hub 214, a switch 216, a router 218, a fan 220, an air duct 222, a telephone 224, an I/O component 226, a power supply 228, and a cooling unit 230.

Figure 3:
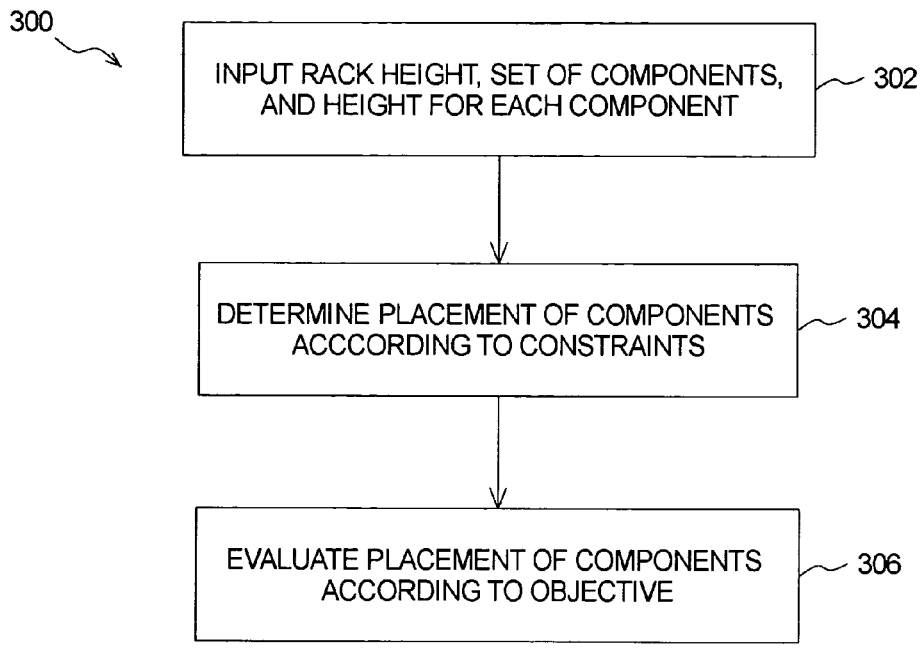
FIG. 3 illustrates a flow chart of a method of determining placement of components in the rack according to an embodiment of the present invention.

A preferred method according to an embodiment of the present invention is illustrated as a block diagram in FIG. 3. The preferred method 300 includes first through third steps, 302, 304, and 306. In the first step 302, a set of input values are provided. The input values may include the rack height 102, a set of components to be placed in a particular rack, and, for each component in the set of components, a height, a weight, and a weight distribution. In the second step 304, a placement of the components is determined according to constraints. The constraints may include not allowing a top height of a component to exceed a rack height, ensuring that each of the components is placed once and only once, and ensuring that none of the slots, 104A . . . 104J, is occupied by more than one component. In the third step 306, the placement of the components is evaluated according to an objective. The objective may be, for example, to obtain a minimum height for a center of gravity. Other examples of possible objectives include placing penalties on soft constraints and attempting to minimize the total penalties, or maximizing the space around a particular component, such as where the component generates significant heat. As yet another example, it may be desired to minimize the number of free slots so that the design is contiguous as possible.

In the computer implemented method, the second and third steps, 304 and 306, preferably employ a mixed integer programming technique. The mixed integer programming technique iteratively performs the second and third steps, 304 and 306, in seeking the objective (e.g., the minimum for the center of gravity). Preferably, the mixed integer programming technique provides a heuristic solution which determines the placement of the components having a low center of gravity but not necessarily a minimum center of gravity. Alternatively, the mixed integer programming technique employs an exact solution technique which provides the minimum center of gravity. Alternatively, the mixed integer programming technique provides a satisfying solution which finds the placement of the components which provides the center of gravity that does not exceed a particular height such as half the rack height 102.

Figure 4:
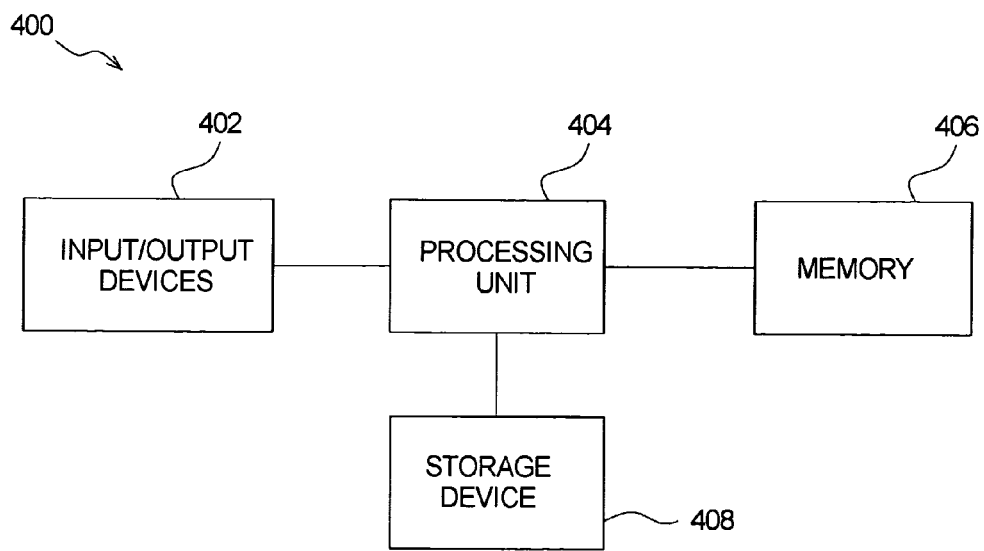
FIG. 4 schematically illustrates a computer for implementing the method of determining placement of the components in the rack according to an embodiment of the present invention.

An embodiment of a computer for implementing the preferred method 300 is illustrated schematically in FIG. 4. The computer 400 includes input/output devices 402, a processing unit 404, a memory 406, and a storage device 408. The input/output devices 402 are coupled to the processing unit 404. The processing unit 404 is coupled to the memory 406. The method 300 begins with the provision of the input values, the constraints, and the objective, which may be stored in the memory 406. The processing unit 404 then performs the second and third steps, 304 and 306, of determining and evaluating the placement of the components. Finally, the placement of the components is provided via the input/output devices 402.

In an embodiment of the present invention, computer code resides on a computer readable memory, which may be read into the computer 400 by one of the input/output devices 404. Alternatively, the computer readable memory comprises the memory 406 or the storage device 408. The computer code provides instructions for the processing unit 404 to perform a method of the present invention. The computer readable memory may be selected from a group consisting of a disk, a tape, a memory chip, or other computer readable memory.

It will be readily apparent to one skilled in the art that the constraints of the preferred method 300 may be described as hard constraints and the objective may be described as a soft constraint or as a sum of soft constraints.

A first alternative method of the present invention adds a height preference constraint to the preferred method 300. The height preference constraint provides that if first and second components are to be placed in a particular rack that the first component be placed above the second component.

A second alternative method of the present invention allows a relaxation of the constraints of the preferred method 300. For example, if it is found that all of the constraints cannot be met, the second alternative method provides a list of particular constraints which cannot be met and provides a choice to a user of which of the particular constraints should be relaxed. Upon selection of the particular constraint to be relaxed, the second alternative method determines the placement of the components in the rack.

A third alternative method of the present invention adds a height range to the input values for a particular component. The height range imposes the condition that the particular component be placed within the height range of a minimum height and a maximum height. Examples for the height range include placement of the particular component within a top half of the rack 100, within a bottom half of the rack 100, or within a middle section of the rack 100.

A fourth alternative method of the present invention allows the height range to be relaxed for one or more components. Preferably, when the height range is relaxed a height range penalty is added to the objective. For example, the penalty may be added to the center of gravity with the relaxed height range making it less optimum than the same center of gravity without the relaxed height range. Alternatively, no penalty is applied for relaxing the height range constraint.

A fifth alternative method of the present invention adds an empty space requirement to the input values for a particular component. The empty space requirement includes an empty space requirement above the particular component, an empty space requirement below the particular component, or an empty space both above and below the particular component.

A sixth alternative method of the present invention allows relaxation of the empty space requirement of the fifth alternative method. Preferably, when the empty space requirement is relaxed for one or more components, an empty space penalty is applied to the objective. Alternatively, the empty space penalty is not applied to the objective.

A seventh alternative method of the present invention adds a contiguous placement constraint to the preferred method 300. When certain components are within the set of components to be placed in the rack, the contiguous placement constraint requires that the certain components be placed contiguously.

A first implementation according to an embodiment of the present invention includes first input values, first decision variables, first constraints, and a first objective.

Exemplary first input values are provided in Table 1.

TABLE 1

| First Input Values | Description |
| --- | --- |
| RackHeight | Number of slots in a rack |
| Boxes | Set of components referred to as boxes |
| $Height_b$ | Height of each component in units of slots where $b \in$ Boxes |
| $Weight_b$ | Weight of each component |
| $WeightDist_b$ | Vertical center of gravity of each component where $WeightDist_b \in [0, 1]$ |
| $HtUb_b$ | Upper placement height for a particular component |
| $HtLb_b$ | Lower placement height for the particular component |
| $HtUbHard_b$ | Hard upper placement height for the particular component |
| $HtLbHard_b$ | Hard lower placement height for the particular component |
| $SpaceAbove_b$ | Number of free slots above the particular component |
| $SpaceBelow_b$ | Number of free slots below a particular component |

If the vertical center of gravity is near a bottom the component, $WeightDist_b$ is near 0. If the vertical center of gravity is near a top of the component, $WeightDist_b$ is near 1. It will be apparent that these assignments of values to indicate the location of the center of gravity for components are arbitrary and that other assignments could be used.

The first decision variables may include an indicator for whether a component base (i.e., the bottom of a component) occupies a particular slot in the rack, a height of the component base in the particular slot, an indicator for whether a first component is above a second component, a center of gravity variable, variables for relaxation of upper and lower limits for height of a particular component, and variables for relaxation of empty space requirements above and below a particular component.

The indicator for whether the component base occupies the particular slot in the rack is $BoxInSlot_{b,sl} \in \{0, 1\}$ where $b \in$ Boxes and $sl \in [RackHeight]$. $BoxInSlot_{b,sl}$ is one if and only if the base of component b is in slot sl. If $BoxInSlot_{b,sl}=1$, then component b occupies slots sl, ..., $sl+Height_b-1$. Throughout this document, [n] denotes the set of integers between 1 and n.

The height of the component base in the particular slot is $BoxAtHeight_b \in [RackHeight]$ where $b \in Boxes$. $BoxAtHeight_b$ is the number of the slot for the base of the component b.

The indicator for whether the first component is above the second component is $Above_{b1,b2} \in \{0, 1\}$ where $b_{1,b2} \in Boxes$. $Above_{b1,b2}$ is one if and only if component $b_1$ is physically racked above component $b_2$.

The center of gravity variable is CenterOfGravity, which is the location of the vertical center of gravity for the rack holding the components Boxes.

The variables for relaxation of upper and lower limits for the height of the particular component are $RelaxBoxHeightUb_b \geq 0$ and $RelaxBoxHeightLb_b \geq 0$ where $b \in Boxes$.

The variables for relaxation of hard upper and lower limits for the height of the particular component are $RelaxHardBoxHeightUb_b \geq 0$ and $RelaxHardBoxHeightLb_b \geq 0$ where $b \in Boxes$.

The variables for relaxation of the empty space requirements above and below the particular component are $RelaxSpaceAbove_b \geq 0$ and $RelaxSpaceBelow_b \geq 0$ where $b \in Boxes$.

The decision variables $BoxAtHeight_b$ and $BoxInSlot_{b,sl}$ may be correlated by $$BoxAtHeight_b = \sum_{sl} sl \cdot BoxInSlot_{b,sl}$$

where $sl \in [RackHeight]$, for all $b \in Boxes$.

The decision variable $Above_{b1,b2}$ may be given by $BoxAtHeight_{b1} + (1 - Above_{b1,b2}) \cdot RackHeight \geq BoxAtHeight_{b2}$ where $Above_{b1,b2} + Above_{b2,b1} = 1$ for all distinct $b_1, b_2 \in Boxes$ and $Above_{b,b} = 0$.

The decision variables $RelaxSpaceBelow_b$ and $RelaxSpaceAbove_b$ may be limited by $RelaxSpaceBelow_b \leq SpaceBelow_b$ and
$RelaxSpaceAbove_b \leq SpaceAbove_b$ for all $b \in Boxes$.

The first constraints include a single placement constraint, a rack height and empty space constraint, an upper non-overlapping constraint, a lower non-overlapping constraint, and a height range constraint.

The single placement constraint may be given by $$\sum_{sl} BoxInSlot_{b,sl} = 1, sl \in [RackHeight]$$

where $b \in Boxes$. This ensures that each component b is placed once and only once.

The rack height and empty space constraint may be given by $SpaceBelow_b - RelaxSpaceBelow_b + 1 \leq BoxAtHeight_b \leq RackHeight - Height_b - (SpaceAbove_b - RelaxSpaceBelow_b)$ for all $b \in Boxes$. This ensures that the top height of component b does not exceed the height of the rack and incorporates the empty space requirements above and below the component b while allowing for relaxation of the empty space requirements.

The upper non-overlapping constraint may be given by $BoxAtHeight_{b2} + 2 \cdot RackHeight \cdot (1 - Above_{b2,b1}) \geq BoxAtHeight_{b1} + Height_{b1} + SpaceAbove_{b1} - RelaxSpaceAbove_{b1}$ for all distinct $b_1, b_2 \in Boxes$, which ensures that the height of component $b_1$ plus the empty space above the component $b_1$ does not overlap the base of component $b_2$. This is trivially satisfied except when $b_2$ is above $b_1$, in which case the slot assigned to component $b_2$ must exceed the slot assigned to component $b_1$ plus the number of free slots allocated above component $b_1$.

The lower non-overlapping constraint may be given by $BoxAtHeight_{b1} + 2 \cdot RackHeight \cdot (1 - Above_{b1,b2}) \geq BoxAtHeight_{b2} + Height_{b2} + SpaceBelow_{b1} - RelaxSpaceBelow_{b1}$ for all distinct $b_1, b_2 \in Boxes$, which ensures that neither the base of the component $b_1$ nor the space below the component $b_1$ overlaps a top of the component $b_2$. This is trivially satisfied except when $b_1$ is above $b_2$, in which case the slot assigned to component $b_1$ must exceed the slot assigned to component $b_2$ plus the number of free slots allocated below the component $b_1$. In the exemplary upper and lower non-lapping constraints given above, the constant 2 may be replaced with any larger constant.

The height range constraints may be given by $HtLb_b - RelaxBoxHeightLb_b \leq BoxAtHeight_b \leq HtUb_b + RelaxBoxHeightUb_b$ and $HtLbHard_b - RelaxHardBoxHeightLb_b \leq BoxAtHeight_b \leq HtUbHard_b + RelaxHardBoxHeightUb_b$ for all $b \in Boxes$ The first objective is to minimize the center of gravity which may be given by $$CenterOfGravity + 10^5 \cdot \sum_{b \in Boxes} (RelaxSpaceAbove_b + RelaxSpaceBelow_b) + 10^6 \cdot \sum_{b \in Boxes} (RelaxBoxHeightUb_b + RelaxBoxHeightLb_b) + 10^7 \cdot \sum_{b \in Boxes} (RelaxHardBoxHeightUb_b + RelaxHardBoxHeightLb_b)$$

where $b \in Boxes$, and $$CenterOfGravity = \sum_{b,sl} BoxInSlot_{b,sl} \cdot Weight_b \cdot (sl + Height_b \cdot WeightDist_b).$$

and where the constants $10^5$, $10^6$, $10^7$ are exemplary and, thus, may be replaced with other constants.

A second implementation according to an embodiment of the present invention may include second input values, a second decision variable, second constraints, and a second objective. For notation purposes in the second implementation, b indicates a component and s indicates a slot in the rack where a top slot in the rack is numbered s=1 and a bottom slot in the rack is numbered s=number of slots in the rack, though different values may be assigned to indicate the position of a slot (e.g., the slots may instead be numbered from bottom-to-top). In the second implementation, components are divided into component sets $B_k$ according to component height k. The second implementation differs from the first implementation in two ways. First, it use it uses fewer input values. Second, it avoids using the variable $BoxAtHeight_b$, an integer variable, and instead uses a location variable, which is a binary variable.

The second input values are given in Table 2.

TABLE 2

| Second Input Values | Description |
| --- | --- |
| H | Number of slots in a rack |
| K | Maximum height of a component, assume K < H |
| $B_k$ | Set of components of height k where k = 1, 2, . . . , K |
| $Weight_b$ | Weight of each component b where $b \in \cup_k B_k$ |
| $WeightDist_b$ | Vertical center of gravity of each component where $WeightDist_b \in [0, 1]$ |

The second decision variable comprises the location variable, which may be given by $X_k(b, s) \in \{0,1\}$, where $X_k(b, s)=1$ if component b occupies slot s and $X_k(b, s)=0$ otherwise. If a base of the component b occupies the slot s, the location variable $X_k(b, s)=1$ for slots s, s−1, . . . , s−k+1.

The second constraints may include not allowing a top of height of a component to extend above the rack, ensuring that each component is placed once and only once, and ensuring that a slot is occupied by no more than a single component.

The constraint of not allowing a top of height of a component to extend above the rack may be given by $X_2(b, 1)=0$ for all $b \in B_2$ $X_3(b, 1)=X_3(b, 2)=0$ for all $b \in B_3$

. . . .

$X_k(b, 1)=X_k(b, 2)= \ldots =X(b, k-1)=0$ for all $b \in B_k$.

The constraint of ensuring that each component is placed once and only once may be given by $$\sum_{s=1}^{H} X_k(b, s) = 1 \text{ for all } b \in \bigcup_k B_k.$$

The constraint of ensuring that a slot is occupied by no more than a single component is provided by slot. For the first slot, the constraint may be given by $$\sum_{b \in B_1} X_1(b, 1) + \sum_{b \in B_2} X_2(b, 2) + \ldots + \sum_{b \in B_k} X_k(b, k) \leq 1$$

For the second slot, the constraint may be given by $$\sum_{b \in B_1} X(b, 2) + \sum_{b \in B_2} [X_2(b, 2) + X_2(b, 3)] +$$

$$\sum_{b \in B_3} [X_3(b, 2) + X_3(b, 3)] + \ldots +$$

$$\sum_{b \in B_k} [X_k(b, k) + X_k(b, k+1)] \leq 1$$

For the third slot, the constraint may be given by $$\sum_{b \in B_1} X_1(b, 3) + \sum_{b \in B_2} [X_2(b, 3) + X_2(b, 4)] +$$

$$\sum_{b \in B_3} [X_3(b, 3) + X_3(b, 4)] + X_3(b, 5) + \ldots +$$

$$\sum_{b \in B_k} [X_k(b, k) + X_k(b, k+1) + X_k(b, k+2)] \leq 1$$

For the sth slot, the constraint may be given by $$\sum_{b \in B_1} X_1(b, s) + \sum_{b \in B_2} [X_2(b, s) + X_2(b, s+1)] + \ldots +$$

$$\sum_{b \in B_k} [X_k(b, s) + X_k(b, s+1) + \ldots + X_k(b, s+k-1)] \leq 1.$$

The second objective is to minimize the center of gravity C which may be given by $$\min C = \sum_{k=1}^{K} \sum_{b \in B_k} \sum_{s=1}^{H} [X_k(b, s) \cdot Weight_b(s + k \cdot WeightDist_b)].$$

A third implementation adds height constraints to the second implementation. The third implementation includes third input values, third decision variables, and the height constraints.

The additional input values are given in Table 3.

TABLE 3

| Third Input Values | Description |
| --- | --- |
| $HtUb_b$ | Soft upper placement height for a particular component |
| $HtLb_b$ | Soft lower placement height for the particular component |
| $HtUbHard_b$ | Hard upper placement height for the particular component |
| $HtLbHard_b$ | Hard lower placement height for the particular component |

The third decision variables include $RelaxHtUb_b$ and $RelaxHtLb_b$, which are relaxation variables for the soft upper and lower placement heights, $HtUb_b$ and $HtLb_b$, respectively.

The height constraints include soft height constraints and hard height constraints. The soft height constraints are given by $X_k(b, s)=0$ for $s<HtUb_b-RelaxHtUb_b$ and $s>HtLb_b+RelaxHtLb_b$. Note that since the slots s are numbered from the top of the rack, upper bounds are given by s being less than the upper bounds and lower bounds are given by s exceeding the lower bounds. For the soft height constraints, a penalty term is added to the second objective according to the sum of $RelaxHtUb_b$ and $RelaxHtLb_b$.

The hard height constraints may be given by $X_k(b, s)=0$ for $s<HtUbHard_b$ and $s>HtLbHard_b$.

A fourth implementation adds the contiguous placement constraint to the second implementation. When certain components are within the set of components to be placed in the rack, the contiguous placement constraint requires that the certain components be placed contiguously. In the fourth implementation, a pre-placement solution may be used to provide a relative placement for the certain components and forms them into a new single component. Then, the second implementation may be used to provide a placement solution for the new single component and remaining components.

A fifth implementation adds a relative height constraint to the second implementation. The relative height constraint ensures that a first component $b_1$ having a first component height $k_1$ is closer to the top of the rack than a second component $b_2$ having a second component height $k_2$. The relative height constraint may be given by:

$$X_{k1}(b_1, 1) \leq X_{k2}(b_2, 1)$$

$$X_{k1}(b_1, 1)+X_{k1}(b_1, 2) \leq X_{k2}(b_2, 1)+X_{k2}(b_2, 2)$$

. . .

$$X_{k1}(b_1, 1)+X_{k1}(b_1, 2)+\ldots+X_{k1}(b_1, H-1) \leq X_{k2}(b_2, 1)+X_{k2}(b_2, 2)+\ldots+X_{k2}(b_2, H-1)$$

where H is the height of the rack.

A sixth implementation adds empty space requirements to the second implementation. The sixth implementation includes fourth input values, a fourth decision variable, and empty space constraints.

The fourth input values are given in Table 4.

TABLE 4

| Fourth Input Values | Description |
| --- | --- |
| $SpaceAbove_b$ | Number of free slots above the particular component |
| $SpaceBelow_b$ | Number of free slots below a particular component |

The fourth decision variable comprises a free slot variable $Z(s)$ where $Z(s)=1$ if the slot s is unoccupied and $Z(s)=0$ otherwise.

The sixth implementation modifies the second implementation's constraint of ensuring that a slot is occupied by no more than a single component. The sixth implementation replaces this constraint with a constraint ensuring that a slot is occupied by either a single component or by an empty slot. For the first slot the constraint may be given by $$\sum_{b \in B_1} X_1(b, 1) + \sum_{b \in B_2} X_2(b, 2) + \ldots + \sum_{b \in B_k} X_k(b, k) + Z(1) = 1$$

For the second slot, the constraint may be given by $$\sum_{b \in B_1} X_1(b, 2) + \sum_{b \in B_2} [X_2(b, 2) + X_2(b, 3)] + \sum_{b \in B_3} [X_3(b, 2) + X_3(b, 3)] + \ldots + \sum_{b \in B_k} [X_k(b, k) + X_k(b, k+1)] + Z(2) = 1$$

For the third slot, the constraint may be given by $$\sum_{b \in B_1} X_1(b, 3) + \sum_{b \in B_2} [X_2(b, 3) + X_2(b, 4)] + \sum_{b \in B_3} [X_3(b, 3) + X_3(b, 4) + X_3(b, 5)] + \ldots + \sum_{b \in B_k} [X_k(b, k) + X_k(b, k, +1) + X_k(b, k+2)] + Z(3) = 1$$

For the sth slot, the constraint may be given by $$\sum_{b \in B_1} X_1(b, s) + \sum_{b \in B_2} [X_2(b, s) + X_2(b, s+1)] + \ldots + \sum_{b \in B_k} [X_k(b, s) + X_k(b, s+1) + \ldots + X_k(b, s+k-1)] + Z(s) = 1.$$

The empty space constraints include requiring one or more empty slots below or above a given component according to the fourth input variables, $SpaceBelow_b$ and $SpaceAbove_b$. The constraint of requiring one empty slot below a given component may be given by $$X_k(b,s) \leq Z(s+1) \text{ for } s=1, 2, \ldots, H-1.$$

This constraint is only imposed when an empty slot is required.

If two empty slots are required below the given component, the constraint becomes $$X_k(b,s) \leq Z(s+1) \text{ for } s=1, 2, \ldots, H-1 \text{ and}$$

$$X_k(b,s) \leq Z(s+2) \text{ for } s=1, 2, \ldots, H-2.$$

The constraint of requiring one empty slot above a given component may be given by $$X_k(b,s) \leq Z(s-k) \text{ for } s=2, \ldots, H+1.$$

This constraint is only imposed when an empty slot is required.

If two empty slots are required above the component, the constraint becomes $$X_k(b,s) \leq Z(s+1) \text{ for } s=1, 2, \ldots, H-1 \text{ and}$$

$$X_k(b,s) \leq Z(s+2) \text{ for } s=1, 2, \ldots, H-2.$$

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method determining placement of components in a rack comprising the steps of:
   providing input variables comprising a rack height, an identification of a set of components, a weight and a height for each component in the set of components;
   determining a placement of the components in the rack according to constraints by solving an optimization problem using a computer, the optimization problem using the rack height, the identification of the set of components, the height and weight for each component and the constraints; and
   evaluating the placement of the components according to at least one objective comprising at least a center of gravity objective,
   wherein the steps of determining and evaluating the placement of the components comprise the use of a mixed integer programming technique.

2. The method of claim 1 wherein the step of determining placement of the components according to the constraints finds that at least one of the constraints cannot be met and further comprising the steps of:
   relaxing a particular constraint; and
   determining placement of the components according to remaining constraints.

3. The method of claim 2 wherein the step of relaxing the particular constraint comprises providing a choice of relaxation constraints to a user and the user selecting the particular constraint from the choice of relaxation constraints.

4. The method of claim 1 wherein the step of evaluating the placement of the components in the rack according to the objective comprises seeking a minimum height for a center of gravity.

5. The method of claim 1 wherein the step of evaluating the placement of the components in the rack according to the objective comprises ensuring that a height of the center of gravity does not exceed a selected height.

6. The method of claim 1 further comprising the step of providing a placement height range for a particular component, wherein the placement height range comprises a minimum height and a maximum height.

7. The method of claim 6 wherein the placement height range is increased, thereby forming an increase in the placement height range, and further wherein a penalty is applied to the objective according to the increase in the placement height range.

8. The method of claim 1 further comprising the step of providing an empty space requirement for a particular component.

9. The method of claim 8 wherein the empty space requirement is selected from the group consisting of an empty space requirement above the particular component and an empty space component below the particular component.

10. The method of claim 8 wherein the empty space requirement is relaxed, thereby forming a relaxation of the empty space requirement, and further wherein a penalty is applied to the objective according to the relaxation of the empty space requirement.

11. The method of claim 1 further comprising a contiguous placement constraint for at least two of the components within the set of components.

12. The method of claim 11 wherein the step of determining the placement of the components in the rack according to the constraints comprises forming a virtual component from the at least two components according to the contiguous placement constraint and further wherein remaining constraints determine placement of the virtual component.

13. The method of claim 1 further comprising the step of evaluating the placement of the components according to a second objective.

14. The method of claim 1 further comprising the step of evaluating the placement of the components according to additional objectives.

15. The method of claim 1 wherein the constraints comprise hard constraints.

16. The method of claim 1 wherein the objective comprises a soft constraint.

17. The method of claim 1 wherein the objective comprises a sum of soft constraints.

18. A method of determining placement of components in a rack comprising the steps of:
   providing input variables comprising a rack height, an identification of a set of components, a weight and a height for each component in the set of components;
   determining a placement of the components in the rack according to constraints by solving an optimization problem using a computer, the optimization problem using the rack height, the identification of the set of components, the height and weight for each component and the constraints; and
   evaluating the placement of the components according to at least one objective comprising at least a center of gravity objective,
   wherein the constraints comprise:
   a rack height constraint which requires that placement of a particular component does not result in a top height of the particular component exceeding the rack height;
   a single placement constraint which requires that each component be placed once and only once; and
   a non-overlapping constraint which requires that each slot in the rack be occupied by no more than a single component.

19. The method of claim 18 wherein the constraints further comprise a height preference constraint which prefers that a first component be placed above a second component.

20. The method of claim 1 wherein the step of employing the mixed integer programming technique employs a heuristic approach.

21. A method of determining placement of components in a rack comprising the steps of:
   providing input variables comprising a rack height, an identification of a set of components, a weight and a height for each component in the set of components and providing a weight distribution for each component in the set of components;
   determining a placement of the components in the rack according to constraints by solving an optimization problem using a computer, the optimization problem using the rack height, the identification of the set of components, the height and weight for each component and the constraints; and
   evaluating the placement of the components according to at least one objective comprising at least a center of gravity objective.

22. A method of determining placement of components in a rack comprising the steps of:
providing a rack height, an identification of a set of components, and, for each component in the set of components, a height, a weight, and a weight distribution;
determining a placement of the components in the rack according to constraints by solving an optimization problem using a computer, the optimization problem using the rack height, the identification of the set of components, the height, weight and weight distribution for each component and the constraints, wherein the constraints comprise:
a rack height constraint which requires that placement of a particular component does not result in a top height of the particular component exceeding the rack height;
a single placement constraint which requires that each component be placed once and only once; and
a non-overlapping constraint which requires that each slot in the rack be occupied by no more than a single component; and
evaluating the placement of the components by seeking a minimum height for a center of gravity of the components.

23. A computer readable memory comprising computer code for directing a computer to make a determination of placement of components in a rack, the determination of the placement of the components comprising the steps of:
obtaining input variables comprising a rack height, an identification of a set of components, a weight and a height for each component in the set of components;
determining a placement of the components in the rack according to constraints by solving an optimization problem using the rack height, the identification of the set of components, the height and weight for each component and the constraints; and
evaluating the placement of the components according to at least one objective comprising at least a center of gravity objectives,
wherein the steps of determining and evaluating the placement of the components comprise the use of a mixed integer programming technique.

24. The computer readable memory of claim 23 wherein the constraints comprise:
a rack height constraint which requires that placement of a particular component does not result in a top height of the particular component exceeding the rack height;
a single placement constraint which requires that each component be placed once and only once; and
a non-overlapping constraint which requires that each slot in the rack be occupied by no more than a single component.

25. The computer readable memory of claim 23 wherein the step of determining placement of the components according to the constraints finds that at least one of the constraints cannot be met and further comprising the steps of:
relaxing a particular constraint; and
determining placement of the components according to remaining constraints.

26. The computer readable memory of claim 25 wherein the step of relaxing the particular constraint comprises providing a choice of relaxation constraints to a user and the user selecting the particular constraint from the choice of relaxation constraints.

27. The computer readable memory of claim 23 further comprising the step of obtaining a weight distribution for each component in the set of components.

28. The computer readable memory of claim 23 wherein the step of evaluating the placement of the components in the rack according to the objective comprises seeking a minimum height for a center of gravity.

29. The computer readable memory of claim 23 wherein the step of evaluating the placement of the components in the rack according to the objective comprises ensuring that a height of the center of gravity does not exceed a selected height.

30. The computer readable memory of claim 23 wherein the step of evaluating the placement of the components comprises the step of employing a mixed integer programming technique.

31. The computer readable memory of claim 30 wherein the step of employing the mixed integer programming technique employs a heuristic approach.

32. A computer readable memory comprising computer code for directing a computer to make a determination of placement of components in a rack, the determination of the placement of the components comprising the steps of:
obtaining a rack height, an identification of a set of components, and, for each component in the set of components, a height, a weight, and a weight distribution;
determining a placement of the components in the rack according to constraints by solving an optimization problem using the rack height, the identification of the set of components, the height, weight and weight distribution for each component and the constraints, wherein the constraints comprise:
a rack height constraint which requires that placement of a particular component does not result in a top height of the particular component exceeding the rack height;
a single placement constraint which requires that each component be placed once and only once; and
a non-overlapping constraint which requires that each slot in the rack be occupied by no more than a single component; and
evaluating the placement of the components by seeking a minimum height for a center of gravity of the components.

* * * * *

UNITED STATES PATENT AND TRADEMARK OFFICE
CERTIFICATE OF CORRECTION

PATENT NO. : 7,286,969 B2 Page 1 of 1
APPLICATION NO. : 10/623444
DATED : October 23, 2007
INVENTOR(S) : Troy Alexander Shahoumian et al.

It is certified that error appears in the above-identified patent and that said Letters Patent is hereby corrected as shown below:

On the title page (73), under "Assignee", in column 1, line 1, delete "Hewlett Packard" and insert -- Hewlett-Packard --, therefor.

In column 11, line 5, in Claim 1, after "method" insert -- of --.

In column 13, line 40, in Claim 23, delete "objectives" and insert -- objective --, therefor.

Signed and Sealed this

Eighth Day of July, 2008

JON W. DUDAS
*Director of the United States Patent and Trademark Office*